United States Patent
Garin et al.

[11] Patent Number: 6,160,226
[45] Date of Patent: Dec. 12, 2000

[54] MOTION TRANSFORMATION SYSTEM FOR ROTARY SWITCHES

[75] Inventors: Gilles Garin, Strasbourg; Henri Ullius, Schwindratzheim, both of France; Gerd Rudolph, Aspisheim, Germany

[73] Assignee: Eaton Corporation, Cleveland, Ohio

[21] Appl. No.: 08/919,409

[22] Filed: Aug. 28, 1997

[51] Int. Cl.$^7$ ...................................................... H01H 3/00
[52] U.S. Cl. ...................... 200/18; 200/61.27; 200/61.54
[58] Field of Search ............................. 200/4, 5 R, 17 R, 200/18, 61.27–61.38, 61.54, 335–337, 553–563, 329–334, 339–345

[56] References Cited

U.S. PATENT DOCUMENTS

| | | | |
|---|---|---|---|
| 4,238,650 | 12/1980 | Cryer et al. | 200/4 |
| 4,379,954 | 4/1983 | Iwata et al. | 200/4 |
| 5,047,600 | 9/1991 | Enari et al. | 200/61.54 |
| 5,272,290 | 12/1993 | Suzuki et al. | 200/4 |
| 5,780,794 | 7/1998 | Uchiyama et al. | 200/61.54 |
| 5,804,782 | 9/1998 | Newman et al. | 200/61.27 |
| 5,804,784 | 9/1998 | Uchiyama et al. | 200/61.54 |

FOREIGN PATENT DOCUMENTS

| | | | |
|---|---|---|---|
| 577499 A1 | 6/1993 | European Pat. Off. | B60Q 16/00 |
| 577500 A1 | 6/1993 | European Pat. Off. | H01H 9/26 |

*Primary Examiner*—J. R. Scott
*Attorney, Agent, or Firm*—Roger A. Johnston

[57] ABSTRACT

Movement transformation system applied to at least two rotary assemblies ER1, ER2 with non-convergent main axes, allowing the transmission of an angular displacement of at least one component 9, 10 of a first rotary assembly ER1 to at least one component 4, 5 of at least a second rotary assembly ER2, the first rotary assembly ER1 being in addition able to rotate freely about a second axis perpendicular to the first, characterized in that each component 9, 10 of the first rotary assembly ER1 is fitted with a mechanical connecting device 12, 13 intended to cooperate with a mechanical connecting device 14, 15 of a component 4, 5 of a second rotary assembly ER2, the devices 12, 13, 14, 15 being configured in such a way as to simultaneously transmit and transform the rotary movement of the component 9, 10 of the first assembly ER1 into a rotary movement of a component 4, 5 about the axis of the second assembly ER2, without inhibiting the rotation of any of the components 9, 10 of the first assembly ER1 about their second axis of rotation, and independently of the operation of the other components of the assemblies.

10 Claims, 4 Drawing Sheets

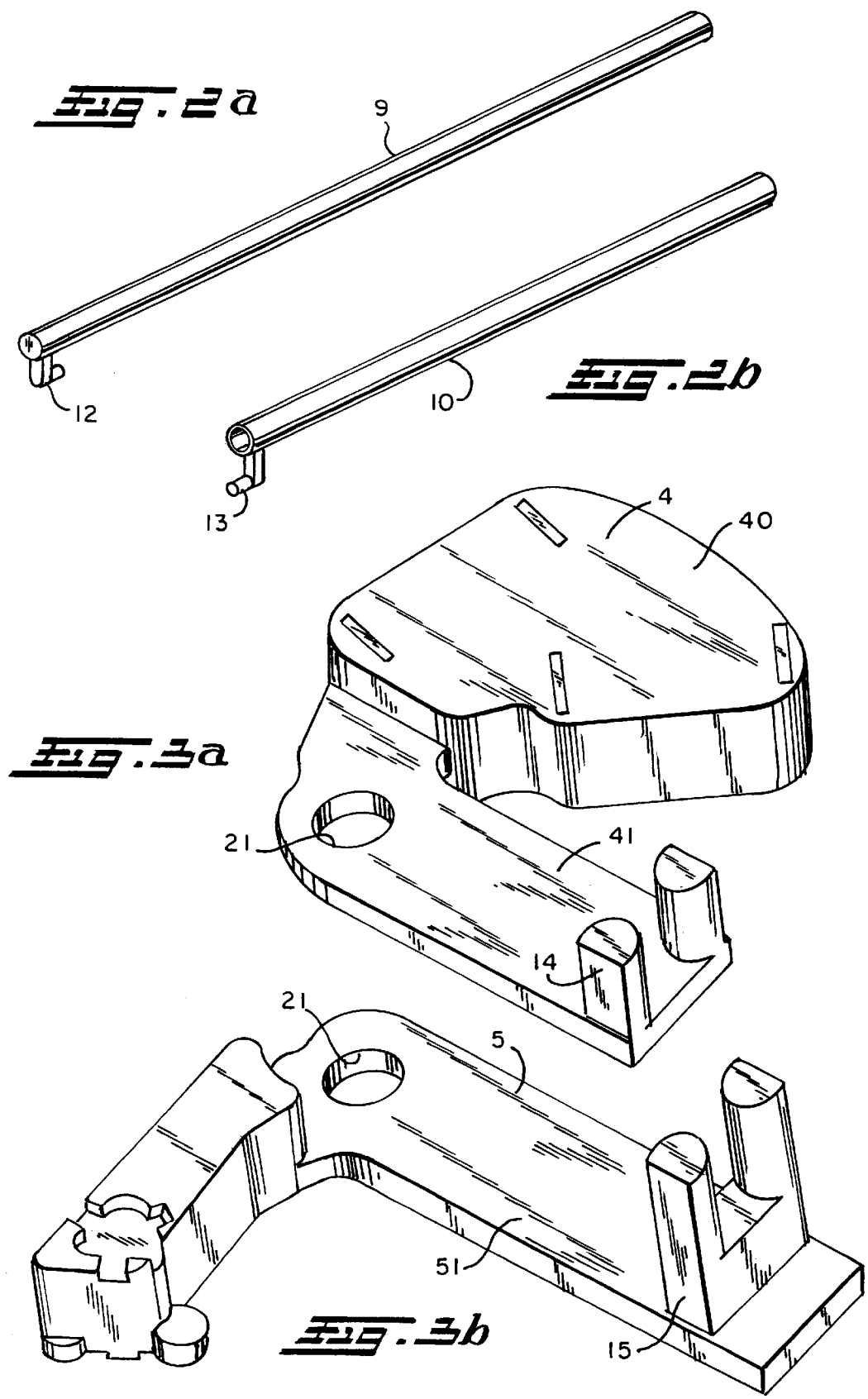

MOTION TRANSFORMATION SYSTEM FOR ROTARY SWITCHES

BACKGROUND OF THE INVENTION

The present invention concerns a movement transformation system applied to at least two rotary assemblies with non-convergent main axes, allowing the transmission of an angular displacement of at least one component of the first rotary assembly to at least one component of the second rotary assembly.

In a configuration such as this, the contacts to be controlled are multiple, as are the positions of the lever's mechanical components. Some functions may need to take place simultaneously, while others are totally separate. The combination of mechanical positions and electrical commutations must however be basically such that the mechanical movements of each of the lever's components are prevented in most cases from interfering with the electrical effects generated by the other components.

In view of the mechanical complexity of the connections, this constraint may cause problems when installing electrical connections. Indeed, each component has its own electrical recognition system for the mechanical position it occupies, forming a cluster of information transmitted to connectors and then to the control devices of the above-mentioned receivers, i.e., the bulbs of the lights referred to above.

To date, angular displacements of levers have for example been controlled by slide blocks on electrical tracks. Linear movement of a block is thus triggered by a spindle equipped with an end finger cooperating with the said block and transmitting the movement imparted to the control lever in the form of a linear displacement.

The electrical switching system of the radial collars of these levers relies on the cooperation between rotary blocks and conductive copper tracks on the collars, the signals of which indicate the relative position of the collar in relation to the lever and are transmitted by wires to a connector providing the link between the lever housing and the vehicle dashboard.

The existence of wire connections generally reduces the reliability of the devices. In addition, assembly/dismantling operations entail the risk of breaking conductors, which are also subjected to mechanical stresses during these operations, and are thus liable to result in joints being broken.

If the number of conductors is small, the risks involved are not very serious. However, the current trend is to add more and more functions to hand levers under the steering wheel, resulting in increasingly complex control levers. Thus the existence of a second radial collar in principle doubles the number of joints, wires, etc.

Consequently the number of parts increases, as does the complexity of the assembly and, the risks of malfunction due for example to a poor connection, a broken conductor, or any other problem of this kind liable to affect joints, conductors, or even the mechanical components themselves used in these assemblies.

Increasing the number of functions provided by hand levers necessarily poses a switching problem: these hand levers are sophisticated switches operating according to several types of mechanical connections and subjecting the corresponding electrical connections to different stresses.

BRIEF SUMMARY OF THE INVENTION

One object of the invention is to provide an entirely redesigned switching system for integration in this type of hand lever, with a view in particular to obtaining significant improvement in overall switching reliability.

Another object is to eliminate a maximum number of parts in order to facilitate assembly and consequently, at the same time, reduce production costs and lead times.

A further object is to allow the application of the same optimized system to simple switch levers, i.e., providing a small number of different or complex functions and controlling multiple commutations. The new concept is for this purpose largely modular.

Lastly, the invention, although allowing commutations according to various connections and mechanical configurations, contains no wires and therefore no joints, with overall reliability of the new concept being greatly enhanced as a result.

As has been mentioned, switch levers or hand levers under the steering wheel of automobiles is one preferred application of the invention, which can however apply to other fields, since wireless switching is basically assured by a movement transformation system controlling the commutation of electrical contacts.

These commutations can be used to transmit information in the form of electrical signals in a wide variety of fields.

In the system according to the invention one assembly, for example the one from which the displacement to be transmitted originates, has an additional degree of freedom: it is able to rotate freely about a second axis perpendicular to the first, at least according to a limited angular clearance.

The preferred application of the invention relates to the field of control levers under automobile steering wheels, and concerns more particularly one such lever equipped with two rotary control collars. The lever may for example control the turn signals, while the two rotary collars control for the one part the sidelights and headlights, and for the other part the front and rear fog lights.

More precisely, the movement transformation system according to the invention is applied to at least two rotary assemblies with non-convergent main axes, allowing the transmission of an angular displacement of at least one component of a first rotary assembly to at least one component of at least a second rotary assembly, the first rotary assembly being able in addition to rotate freely about a second axis perpendicular to the first; and it is characterized in that each component of the first rotary assembly is fitted with a mechanical connecting device intended to cooperate with a mechanical connecting device of a component of a second rotary assembly, the said devices being configured in such a way as to simultaneously transmit and transform the rotary movement of the component of the first assembly into a rotary movement of a component about the axis of the second assembly, without inhibiting the rotation of any of the components of the first assembly about their second axis of rotation, and independently of the operation of the other components of the said assemblies.

The components of each rotary assembly rotate about the same axis and have an area close to a component of another assembly in which the mechanical connection is made.

According to one embodiment, the mechanical connecting device fitted to each component of the first rotary assembly consists of a protuberance, the center plane of which contains the first rotational axis of the said component and is perpendicular to its second axis of rotation.

More precisely, the said protuberance is an L-shaped finger.

Preferably, the L-shaped which forms the protuberance has a bridge perpendicular to the first axis of rotation of the component to which it is attached, and a base parallel to the said axis.

This particular configuration is intended to cooperate with a corresponding configuration situated on the second rotary assembly.

Generally, the mechanical connecting device fitted to each component of the second rotary assembly has two protuberances parallel to the axis of rotation of the said assembly, between which is located at least one part of the mechanical connecting device of one of the components of the first rotary assembly, such that it can exert a lateral action against one or the other of the said parallel protuberances.

The mechanical connecting device fitted to each component of the second assembly can for example consist of a U-shaped, two-pronged fork opening onto the components of the first rotary assembly, the gap between the prongs being greater than the thickness of the L-shaped finger, at least at its base.

The proposed configuration of both rotary assemblies makes it possible globally to transform a rotary movement according to a specific axis of rotation into a second rotary movement about an axis different from the first.

In most cases, particularly when applied to switch levers, two rotary assemblies are used, each containing at least one component.

In this particular application, the first rotary assembly consists of a control lever with at least two rotary collars locked to corresponding concentric actuating spindles, the said lever being able in addition to rotate freely about at least one pivoting axis according to a limited angular clearance. In reality there are often two of them, perpendicular to each other, allowing independent movements.

It is important to emphasize the existence of these axes of rotation, as they influence the mechanical design of the connecting system between both rotary assemblies, since rotation about these axes must not be inhibited by the coupling of rotations about the other two axes.

The second rotary assembly consists of at least two superposed slides pivoting about a common axis and activated by the actuating spindles of the lever collars.

Each slide is fitted with contacts which are designed to commutate other contacts located in a housing to which both rotary assemblies, respectively the control lever and the switching plates, are connected.

The complex mechanical connections of the switch lever in this housing therefore do not have any electrical circuits. The considerable advantage obtained by the invention compared to systems available to date is this independence between most of the mechanical movements and the electrical connections, which considerably improves the reliability of the assembly.

Preferably, the contacts located on the two superposed slides are situated in a single plane and cooperate by sliding along profiled switching tracks in a flat base of the said housing.

In this way, all switches triggered by movements of the collars take place in a single plane, since both superposed slides each have an area in contact with the said base.

BRIEF DESCRIPTION OF THE DRAWINGS

The invention will now be described in detail with reference to the enclosed figures, in which:

FIGS. 2a and 2b are perspective views of the pivoting spindles in the control lever;

FIGS. 3a and 3b are perspective views of the two slides forming the second rotary assembly.

These figures illustrate a preferred configuration of the invention and their aim is not to limit protection only to the forms disclosed.

DETAILED DESCRIPTION OF THE INVENTION

Figure 1A:
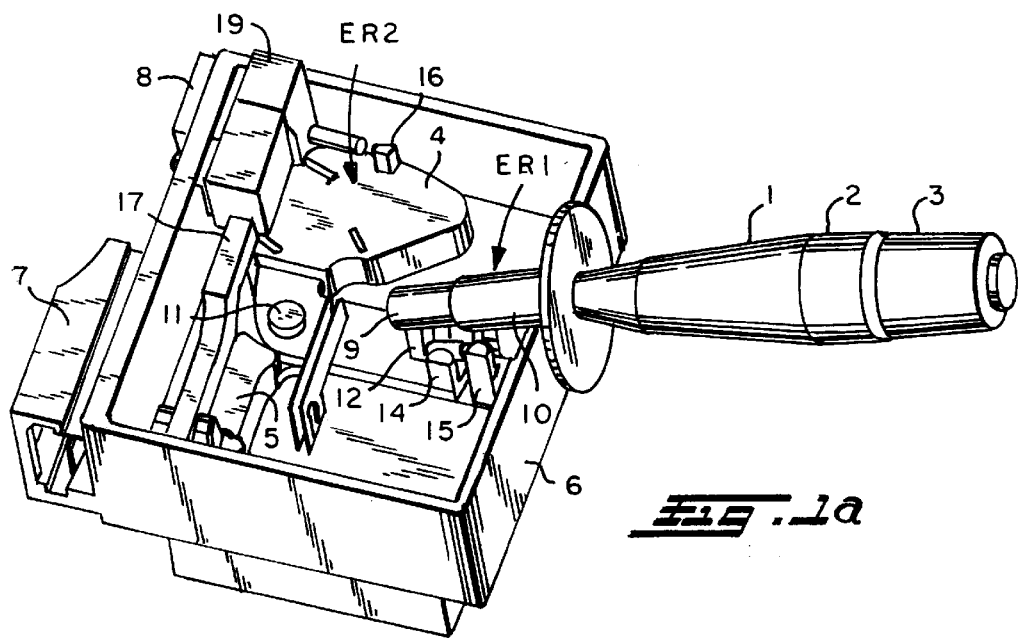
FIG. 1a is a perspective view of the housing and main components of the invention located in it.
Figure 1B:
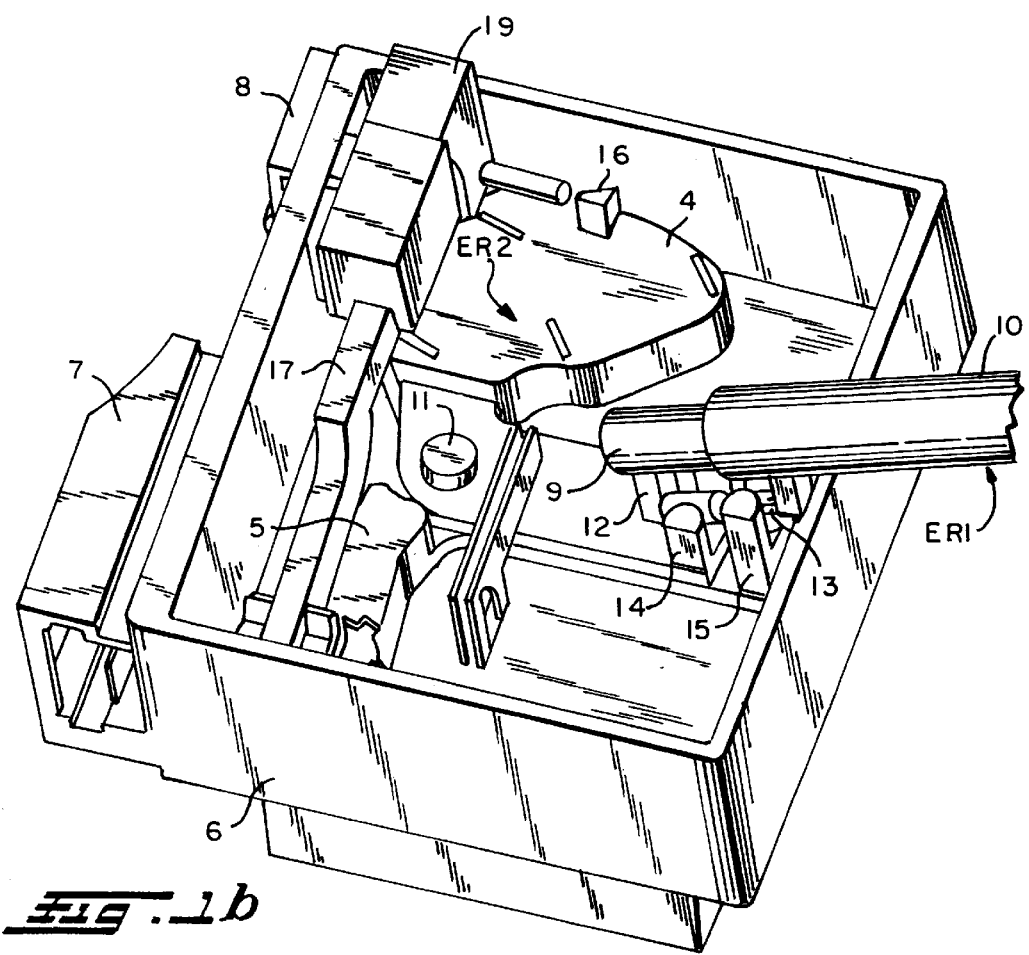
FIG. 1b is an enlarged view of the housing itself.

FIGS. 1a and 1b show the system components according to the invention in functional interaction with each other. The configuration illustrates the preferred field of automobile application.

Both rotary assemblies ER1 and ER2 rotate about two different axes located in two intersecting planes. The rotary assembly ER1 is in reality locked to the hand lever 1 under the steering wheel constituting the switch lever and is fitted with end collars 2, 3 pivoting about the axis of symmetry of the lever 1.

The rotary assembly ER2 has rotary slides 4, 5 pivoting in a plane parallel to the plane of the bottom of the housing 6, which contains most of the mechanical components. The housing is intended to be secured behind the vehicle's steering wheel, particularly by means of the mechanical connection pieces 7, 8 on one side of the housing 6.

The two main axes of rotation are provided firstly by the concentric spindles 9, 10 of the first rotary assembly ER1, and secondly by the pivot 11 of the second assembly ER2. Each of the concentric spindles 9, 10 contains at one end an L-shaped actuating finger 12, 13 cooperating with a fork 14, 15 of one of the rotary slides 4, 5, as will be shown in greater detail below.

According to one automotive application, the functions provided by the hand lever under the steering wheel are as follows:

the collar 2 switches the fog lights;

the collar 3 switches the sidelights and headlights; and the complete lever switches the turn signals, in a manner not described in detail since it is not the object of the invention.

Rotation of the collars 2, 3 (for example in successive 30° angles) results in rotation of their respective actuating spindles 9, 10, followed by rotation of the corresponding slides 4, 5 through the action of the L-shaped fingers 12, 13 cooperating with the bifid forks 14, 15 of the slides 4, 5.

The slides 4, 5, to which the switch blocks are attached, pivot flat on the base of the housing 6 and ensure the electrical commutations. All commutations resulting from this particular split kinematics take place mechanically inside the housing. There are therefore no connecting wires between the collars 2, 3 and the base.

According to one option, when the collar 3 is actuated to return from a dipped or low-beam headlights position to a sidelights or off position, and when the commutation is simultaneously locked on full-beam headlights, automatic unlocking is necessary in order to return to dipped or low-beam headlights from a lower position when used again later.

An unlocking cam 16 has therefore been provided, which activates a full beam, low-beam or dipped headlights reversing lever 17. Conversely, there is also a cam 19 for locking in the full-beam position.

FIGS. 2a and 2b represent the two main components of the rotary assembly ER1, namely the concentric actuating spindles 9 (FIG. 2*a*) and 10 (FIG. 2*b*). The two L-shaped fingers 12, 13 each face the opposite way.

These actuating spindles 9, 10 rotate freely with respect to each other and are connected to the collars 2, 3 by a mechanical system which itself is not part of the invention and is therefore not described in detail.

FIGS. 3*a* and 3*b* represent the two slides 4 and 5. The lower slide 5 has a flat sole plate on which are arranged the contacts to be commuted as a result of sliding along tracks (not shown) profiled in the base of the housing 6.

The upper rotary slide 4 has a sole plate with two flat levels: one level corresponding to the main body 40 of the slide is coplanar with the sole plate of the slide 5 during operation. This section includes the contacts to be commuted on the tracks of the base.

A second section forms the sole plate of a bracket 41 in contact with the upper surface of a bracket 51 of the slide 5. These two surfaces slide over each other when at least one of the slides rotates about the pivot 11.

The brackets 41, 51 hold the bifid forks 14, 15 respectively cooperating with the L-shaped fingers 12, 13 of the actuating spindles 9, 10 constituting the first rotary assembly ER1. The holes 21 in the slides 4, 5 are intended to accommodate the pivot stud 11 of the slides 4, 5. These slides may perform other secondary functions within the scope of the invention, as outlined above.

Figure 4A:
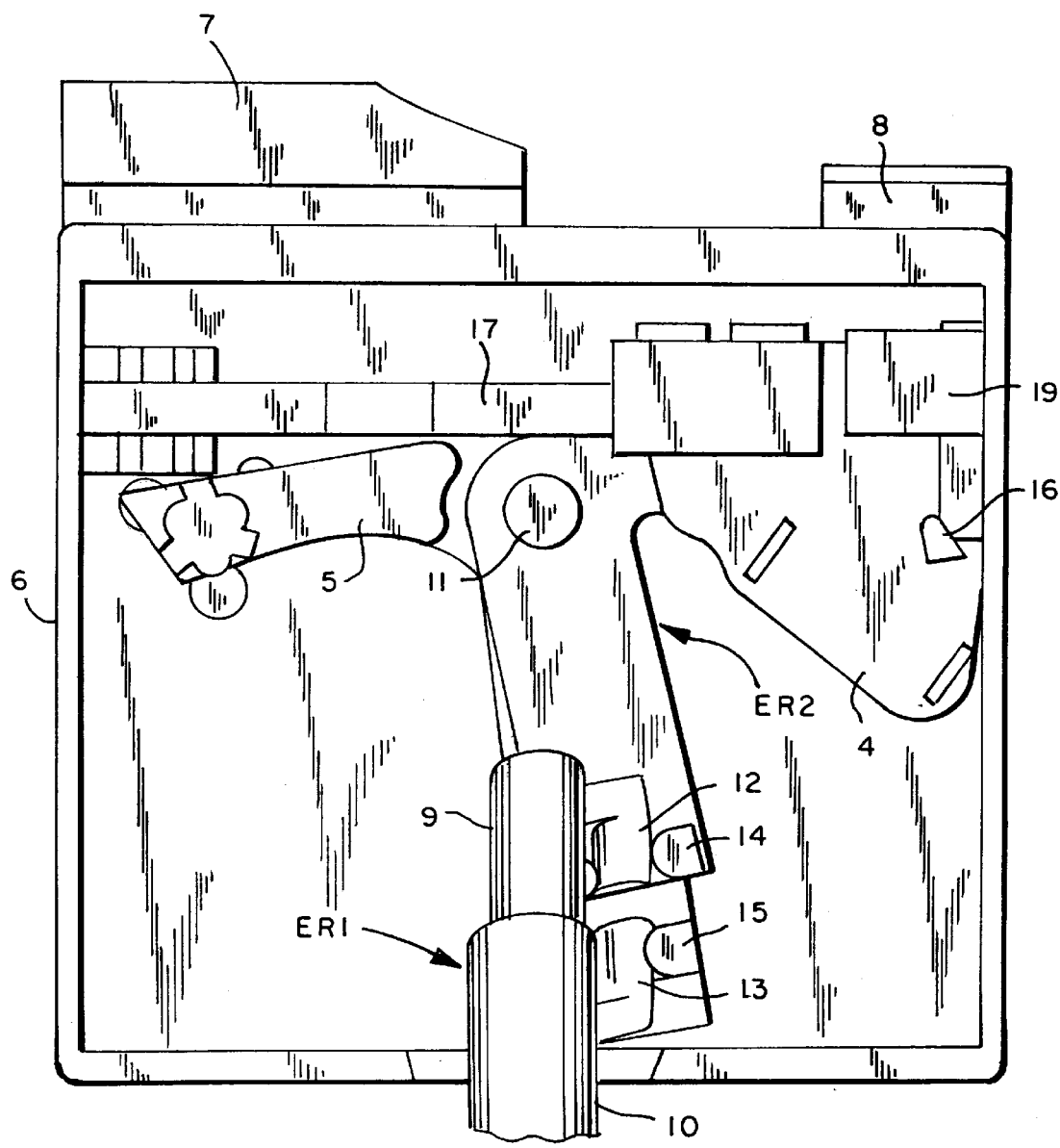
FIGS. 4a and 4b are top views of all components located in the housing in two different operating positions.
Figure 4B:
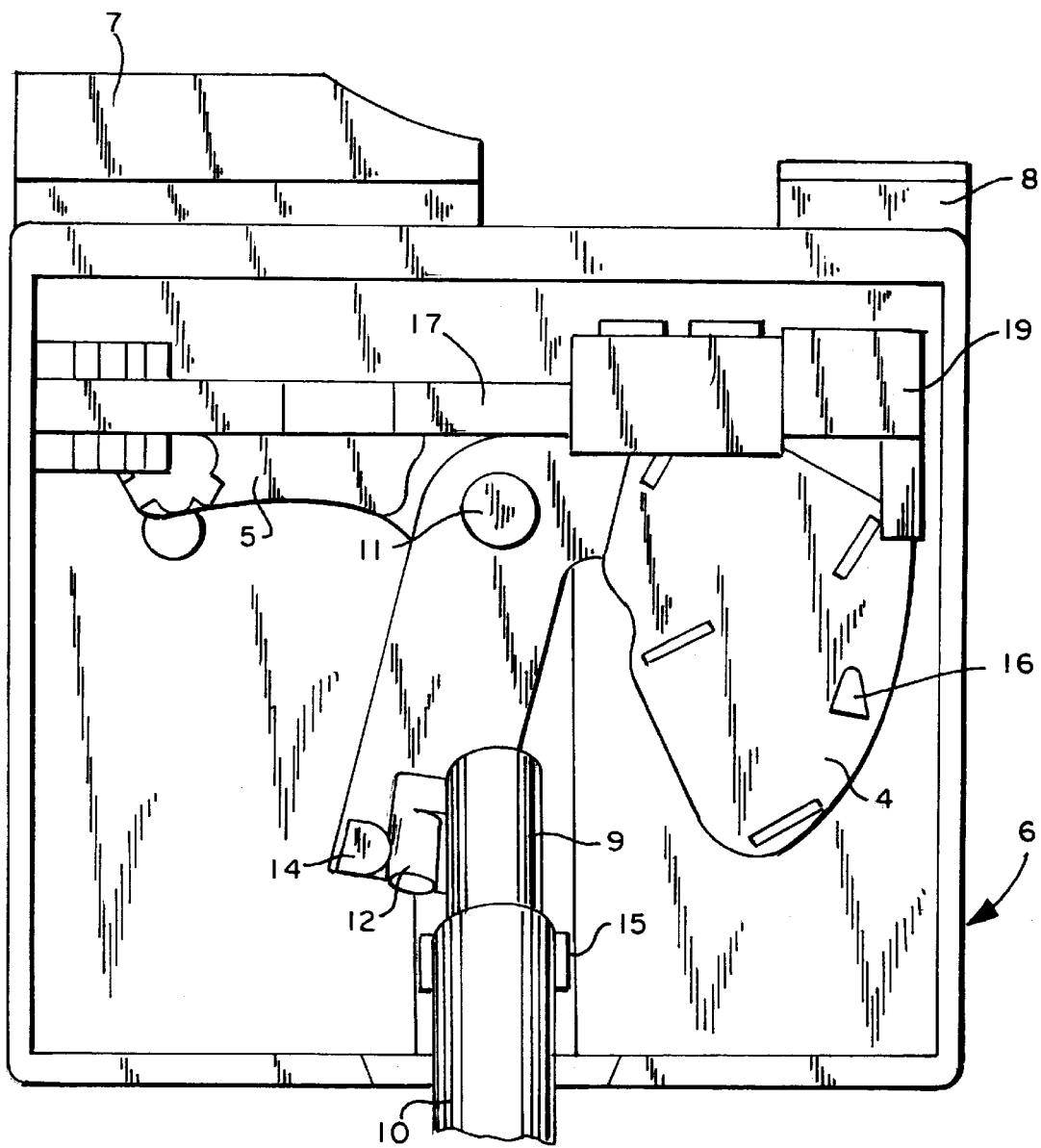

FIGS. 4*a* and 4*b* show the independence of the components of the rotary assemblies ER1 and ER2, indicating two separate and independent positions for each slide 4, 5 and consequently for each spindle 9, 10.

Thus, in FIG. 4*a*, both slides 4, 5 are pushed to the right of the figure, and the fingers 12, 13 consequently also appear on the right-hand side. This basically is the rest position of both collars, i.e. the position in which fog lights, sidelights or headlights are off. In this position, it should also be noted that the full beam locking cam 16 impels the dipped or low-beam headlights/full beam reversing lever 17.

In FIG. 4*b*, the actuating spindle 10 is in the median position, the L-shaped finger 13 is no longer visible, and this configuration activates the front fog lights. If the collar 2 were rotated another 30° in a clockwise direction, both front and rear fog lights would be switched on.

This latter position is shown for the actuating spindle 9, in the "dipped or low-beam headlights on" position. In all cases, commutation occurs as the sole plates of the slides 4, 5 slide over the base of the housing 6, as a result of rotation of the fingers 12, 13 induced by the collars 2, 3 of the hand lever 1 under the steering wheel.

In the illustrated embodiment, a device with two moving parts was used in each rotary assembly; this can of course be modified; and, it is, for example, possible to provide a system with 3 concentric shafts activating three rotary slides.

Similarly, the shapes used, for example those of the L-shaped fingers, are not limitative and may be designed to accommodate the shape of the slides, which can also be modified within the scope of the invention.

What is claimed is:

1. A movement transformation system applied to a plurality of rotary assemblies each operable to rotate about a main axis and having axes non-converging comprising:

(a) a first rotary assembly having a first component operable to transmit angular displacement to a second component of a second rotary assembly, said first rotary assembly operable to also rotate freely about a second axis perpendicular to its main axis;

(b) said first component includes a first mechanical connecting device and said second component includes a second mechanical connecting device wherein said first and second mechanical connecting devices are configured and operable to transmit the rotary movement of the first component to the second component about the main axis of said second rotary assembly without inhibiting the rotation of the first component about said second axis and independently of the operation of the other components in said assemblies.

2. Movement transformation system according to claim 1, characterized in that the mechanical connecting device fitted to each component of the first rotary assembly consists of a protuberance 12, 13, the center plane of which contains the first axis of rotation of the said component and is perpendicular to its second axis of rotation.

3. Movement transformation system according to claim 2, characterized in that the said protuberance is an L-shaped finger 12, 13.

4. Movement transformation system according to claim 3, characterized in that the L forming the protuberance 12, 13 contains a bridge perpendicular to the first axis of rotation of the component to which it is attached, and a base parallel to the said axis.

5. Movement transformation system according to claim 1, characterized in that the mechanical connecting device 14, 15 fitted to each component of the second rotary assembly is equipped with two protuberances parallel to the axis of rotation of the said assembly, between which is located at least one part of the mechanical connecting device 12, 13 of one of the components of the first rotary assembly, such that it can exert a lateral action against one or the other of the said parallel protuberances.

6. Movement transformation system according to claim 5, characterized in that the mechanical connecting device 14, 15 fitted to each component of the second assembly consists of a U-shaped, two-pronged fork opening onto the components of the first rotary assembly, whereby the gap between the prongs is greater than the thickness of the L-shaped finger 12, 13, at least in the part forming the base.

7. Movement transformation system according to claim 1, characterized in that the first rotary assembly ER1 consists of a control lever 1 with at least two rotary collars 2, 3 locked to corresponding concentric actuating spindles 9, 10, the lever 1 being able in addition to rotate freely about at least one pivoting axis according to a limited angular clearance.

8. Movement transformation system according to of claim 1, characterized in that the second rotary assembly ER2 consists of at least two superposed slides 4, 5 pivoting about a common axis 11 and activated by the actuating spindles 9, 10 of the collars 2, 3 of the lever 1.

9. The system defined in claim 1, further comprising a third rotary assembly having a main axis of rotation coincident with the main axis of said second rotary assembly wherein said first rotary assembly is also operable to transmit angular displacement to said third rotary assembly independently of said second rotary assembly without inhibiting the rotation of said first component about said second axis.

10. The system defined in claim 9, wherein said first rotary assembly includes an inner and an outer member co-axially disposed on the main axis of said first rotary assembly.

* * * * *